(12) United States Patent
Qian

(10) Patent No.: US 6,507,174 B1
(45) Date of Patent: Jan. 14, 2003

(54) VOLTAGE REGULATOR WITH CLAMPING CIRCUIT

(75) Inventor: Jinrong Qian, Plano, TX (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/948,804

(22) Filed: Sep. 6, 2001

(51) Int. Cl.$^7$ .............................................. G05F 1/652
(52) U.S. Cl. ....................... 323/222; 323/224; 323/225
(58) Field of Search ................................. 323/222–225, 323/268, 271, 282, 311, 351; 363/55, 56.01, 56.09, 56.12

(56) References Cited

U.S. PATENT DOCUMENTS

| 5,038,267 | A | * | 8/1991 | De Doncker et al. ....... 363/124 |
| 5,528,480 | A | | 6/1996 | Kikinis |
| 5,731,731 | A | | 3/1998 | Wilcox et al. |
| 5,736,842 | A | * | 4/1998 | Jovanovic ................... 323/222 |
| 5,880,940 | A | | 3/1999 | Poon |
| 5,929,692 | A | | 7/1999 | Carsten |
| 5,949,224 | A | | 9/1999 | Barkaro |
| 5,973,944 | A | | 10/1999 | Nork |
| 5,987,238 | A | | 11/1999 | Chen |
| 5,991,171 | A | | 11/1999 | Cheng |
| 6,018,469 | A | | 1/2000 | Poon |
| 6,061,253 | A | * | 5/2000 | Igarashi et al. ................ 363/19 |
| 6,061,254 | A | | 5/2000 | Takegami |
| 6,191,960 | B1 | | 2/2001 | Fraidlin et al. |
| 6,239,993 | B1 | | 5/2001 | Fraidlin et al. |
| 6,259,235 | B1 | | 7/2001 | Fraidlin et al. |
| 6,272,027 | B1 | * | 8/2001 | Fraidlin et al. ............. 323/222 |

* cited by examiner

Primary Examiner—Michael Sherry
Assistant Examiner—Gary L. Laxton

(57) ABSTRACT

A circuit for clamping a voltage across a switching element to a value equal to or less than the sum of the input voltage plus the voltage across a clamping capacitor is provided. The circuit achieves voltage clamping accordance with one embodiment in which an active clamp circuit includes a switch and a clamping capacitor connected in parallel with a first winding of a coupled winding. The active clamp prevents the occurrence of voltage spikes across the switch. The clamping capacitor recovers energy stored in the first winding of the coupled winding. The circuit achieves voltage clamping in accordance with a second embodiment in which a passive clamp circuit includes a switch a clamping capacitor, and first and second diodes. The passive clamp circuit prevents the occurrence of voltage spikes across the switch. The clamping capacitor recovers energy stored in the first winding of the coupled winding.

18 Claims, 6 Drawing Sheets

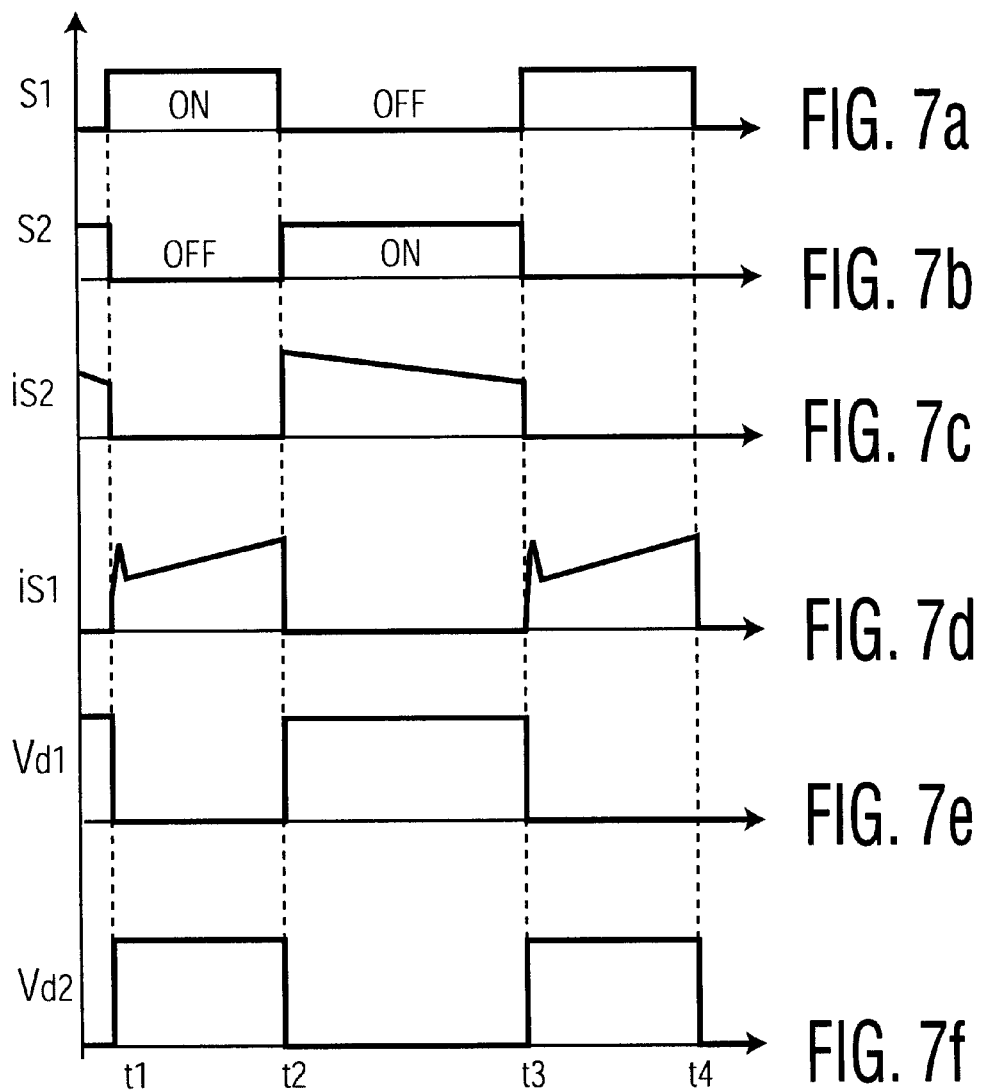

VOLTAGE REGULATOR WITH CLAMPING CIRCUIT

1. Technical Field of the Invention

The present invention relates to the field of switching power supplies, and in particular, to a switching voltage regulator module.

2. Description of the Related Art

Advances in integrated circuit (IC) technology often relate to the ever-decreasing operating voltages required to operate such circuits. A lower operating voltage may translate into lower costs due to decreases in circuit size and power consumption. Present demands for faster and more efficient data processing have prompted a significant development effort in the area of low-voltage integrated circuits. Currently, low-voltage integrated circuits operating in the three-volt range (e.g., 3.3 V ICs) are highly desirable. The three-volt ICs are gradually replacing the standard five-volt ICs due to their higher speed and higher integration densities.

Moreover, the three-volt ICs consume less power than the traditional five-volt ICs. Thus, in battery operated devices, such as portable telephones and lap-top computers, low-voltage integrated circuits allow the devices to operate proportionally longer than devices requiring higher voltage for operation.

However, the 3.3 V ICs represent only a transition to ICs with even lower operating voltages that will not only further improve speed and reduce power consumption, but will also allow direct, single-cell battery consumption. It is expected that the next generation of data processing ICs will be operable at voltages in the 1–2 V range. At the same time, since more devices are integrated on a single processor chip and the processors operate at higher frequencies, microprocessors require aggressive power management. Compared with current processors which require a current draw of around 13 amps, future generation processors will require a current draw in the range of 50–100 amps. The load range may reach 1:100.

Further, as the speed of the ICs increase, they are becoming more dynamic loads to their power supplies. Next generation microprocessors are expected to exhibit current slew rates of 50A/microsecond. Moreover, the output voltage regulation becomes much tighter (e.g., from 5% to 2%). Voltage regulator modules (VRMs) which feed the microprocessors have to have high efficiency, fast transient response and high power density. These requirements pose serious design challenges.

FIG. 1 is a schematic block diagram of a prior art synchronized buck converter 100. The circuit 100 is typically used as a VRM to meet the requirements of high efficiency, fast transient response and high power density. In operation, switches S1 and S2 turn on and off in complementary fashion. The voltage gain of the buck converter circuit 100 can be described by:

$$D = V_o/V_{in} \quad (1)$$

where D is the duty ratio of switch S1.

As is well known in the art, the buck converter has a high efficiency and good transient response at around a duty cycle of 0.5. For a 5V input voltage and a 2V output, the duty cycle is 0.4, which is an acceptable duty cycle ratio for achieving high efficiency.

Since future VRMs will be required to provide more power to the microprocessors, the power switch must be able to deal with higher currents, which decreases efficiency. However, in accordance with the power equation, the increased power required by future microprocessors may be achieved by raising the input voltage instead, which allows the input current to be decreased, thereby reducing conduction losses. In addition, this also reduces the size of the capacitance. As such, it is preferable that VRMs have a 12V or higher input voltage. For example, the input voltage can be as high as 19V for notebook computers. According to equation (1), the duty cycle for a conventional synchronized buck converter is as small as 0.1 with a 12V input and a 12V output. A drawback of a duty cycle on the order of 0.1 is that the circuit exhibits poor performance in terms of efficiency, voltage regulation and transient response.

FIG. 2 is a circuit diagram of a tapped converter circuit 200 according to the prior art. The converter circuit 200 includes a first power switch S1 connected across an unregulated DC input source, $V_{in}$. One side of power switch S1 is connected to a first winding N1 of a tightly coupled winding pair (N1, N2). The coupled winding pair (N1, N2) is connected at junction 12 to filter capacitor $C_o$ and load $R_L$. Filter capacitor $C_o$ and load $R_L$ are connected in parallel. Converter circuit 200 further includes a second power switch S2 connected in series with a second winding N2 of the winding pair (N1, N2). The serially connected power switch S2 and second winding N2 are connected in parallel with the filter capacitor $C_o$ and load $R_L$.

The operation of the converter circuit 200 will be described with reference to FIGS. 3a–3g which illustrates the corresponding switching waveforms associated with the converter circuit 200.

At a time prior to time t1, switch S1 is OFF. From a time t1 to a time t2, switch S1 is turned ON (see FIG. 31a) and switch S2 is turned off (see FIG. 3b). The voltage difference between the input voltage $V_{in}$ and the output voltage $V_o$, i.e., ($V_{in}-V_o$) is applied to winding N1 of the coupled inductor windings N1 and N2. The input current $i_{s1}$, which is the winding current in N1, increases linearly as shown in FIG. 3c. Therefore, during the time t1 to t2, the input voltage delivers power to the output through the conduction of switch S1 and winding N1. During this time, energy is stored in winding N1.

At a time equal to t2, switch S1 is turned OFF and switch S2 is turned ON. The energy stored in winding N1 from time t1 to t2 is transferred to winding N2. The winding current $i_{N2}$ flows through switch S2 to release its energy to the output. The process operates as a flyback converter. Based on the voltage-second balance in winding N1, the voltage gain of the converter circuit 200 can be written as:

$$V_o/V_{in} = 1/[1+(N_1/N_2)*(1/D-1)] \quad (2)$$

where D is the duty ratio of switch S1. From equation (2) it can be seen that a duty cycle on the order of 0.5 can be realized to achieve a high circuit efficiency by properly choosing the turns ratio of the coupled inductors. As one example, for an input voltage, $V_{in}=12V$, an output voltage, $V_o=1.5V$, and a desired duty cycle, D=0.5, the ratio $N_1/N_2=7$.

One disadvantage of circuit 200 is that a high voltage spike occurs across switch S1 when S1 turns off (e.g., at time t2, see FIG. 3f) because the leakage energy of winding N1 cannot be transferred to winding N2 due to an imperfect coupling between windings N1 and N2. The leakage energy stored in leakage inductor $L_k$ (not shown) which cannot be transferred to winding N2 charges the output parasitic capacitance (not shown) of switch S1 through conducting switch S2 which causes a high voltage stress across S1. As a result, a high voltage rated MOSFET switch must be used in the circuit 200 which significantly increases the power loss and reduces the efficiency.

It would be desirable to provide a circuit configuration which avoids the necessity of using a high voltage rated MOSFET switch and which recycles the leakage energy of the coupled leakage inductor to further improve circuit efficiency.

SUMMARY OF THE INVENTION

It is, therefore, a primary object of the present invention to provide a circuit so that a low-voltage rated power switch can be used to improve circuit efficiency.

It is another object of the present invention to provide a circuit which recycles the leakage energy of a coupled leakage inductor to further improve circuit efficiency.

It is yet another object of the present invention to provide a circuit which uses as few components as necessary.

According to a first embodiment of the present invention, there is provided an active clamp step-down converter circuit with a power switch voltage clamping function including a first switch connected in series with an unregulated DC input source, a second switch coupled at one junction to a coupled winding having a first winding and a second winding, a leakage inductance associated with one winding of the coupled winding, a shottky diode connected in parallel with the second switch, and an active clamp circuit including a clamping capacitor and a third switch connected in series. The clamp circuit is connected in parallel with the leakage inductance and the first winding. The converter circuit further includes a filter capacitor connected to a coupled winding and in parallel with a load.

The clamping capacitor clamps the voltage across the first switch during the time in which the first switch is off. The clamped voltage across the first switch is the sum of the input voltage and clamping capacitor voltage.

According to a second embodiment of the present invention, there is provided a clamped step-down converter circuit with a power switch voltage clamping function including a first switch connected in series with an unregulated DC input source, a second switch coupled at one junction to one terminal of a coupled winding having a first winding, a second winding and a third winding, a leakage inductance associated with one winding of the coupled winding, a passive clamp circuit including a second diode whose anode is connected in series with one terminal of the third winding of the coupled winding and whose cathode is connected to the DC input source; a first diode whose cathode is connected to another terminal of the third winding and whose anode is connected to one terminal of the second winding of the coupled winding. A second terminal of the diode being serially connected to an anode of a second diode. The clamping circuit further includes a clamping capacitor connected in parallel with the first and second diodes and third winding of the coupled winding. The converter circuit further includes a filter capacitor connected at a midpoint of the coupled winding and connected in parallel with a load.

As in the first embodiment, the clamping capacitor clamps the voltage across the first switch during the time in which the first switch is off. The clamped voltage across the first switch is the sum of the input voltage and clamping capacitor voltage.

A main advantage provided by the present invention is the prevention or substantial elimination of voltage spikes which would otherwise occur at each switch transition to the OFF state. Voltage spikes are eliminated by incorporating the active clamp circuit in parallel with the first winding.

A further advantage of the present invention is that by recovering the leakage energy in each switching cycle, as opposed to dissipating it in accordance with prior art approaches, the overall circuit efficiency (i.e., power out/power in) is enhanced. An additional advantage of capturing the leakage current is that the voltage rating of the first switch is significantly reduced thereby reducing its cost.

A still further advantage;of the present invention is that the circuit is optimized to operate with a duty cycle of around 0.5 which improves the dynamic response and system efficiency. By operating with a nominal duty cycle of around 0.5, the circuit is responsive to changing load conditions. That is, when the load changes from a nominal to a heavy load, the duty cycle must be raised from 0.5 to a value close to 1.0 to insure that the output voltage variation remains within specification. Similarly, when the load changes from a nominal load to a light load, the duty cycle must be lowered from 0.5 to a value close to zero to insure that the output voltage variation remains within specification. The required changes in the duty cycle are most easily effected with a circuit that operates according to the present invention.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIGS. 7a–7f illustrate representative waveforms of the circuit of FIG. 6.

DETAILED DESCRIPTION OF THE PREFERRED EMBODIMENTS

In embodiments of the present invention, a clamped step-down converter for a voltage regulator module (VRM) is provided which eliminates or significantly reduces voltage spikes which occur across the circuit switching element during turn-off at each switching cycle. Additionally, embodiments of the converter circuit of the present invention are more power efficient than converter circuits of the prior art in that inductor leakage energy is recovered during intervals between conduction by the switching element.

Figure 1:
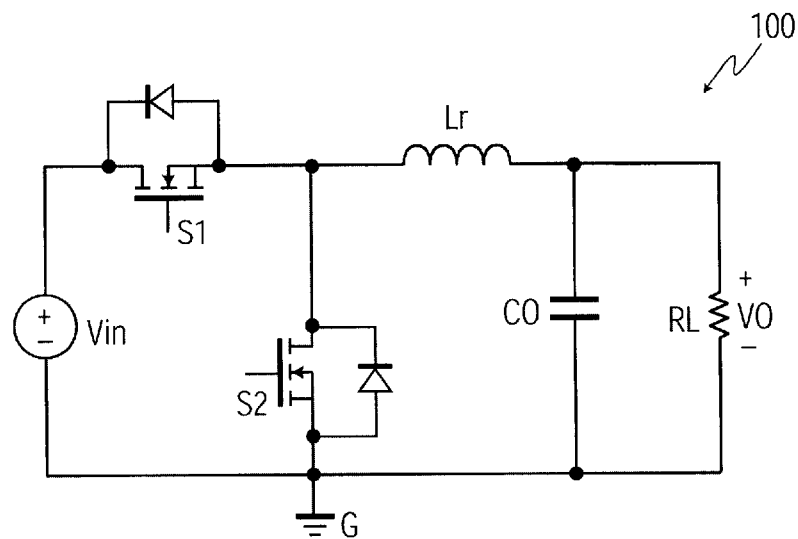
FIG. 1 is a circuit diagram illustrating a synchronized buck converter circuit for use as a voltage regulating module in accordance with the prior art.
Figure 2:
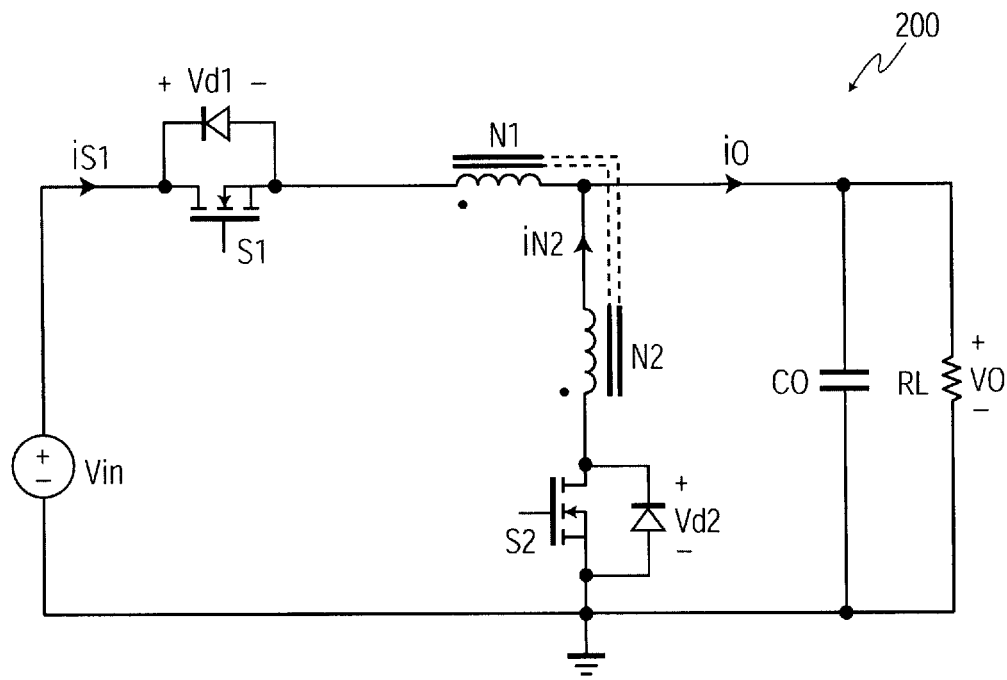
FIG. 2 is a circuit diagram illustrating a tapped step-down converter circuit according to the prior art.
Figure 3:
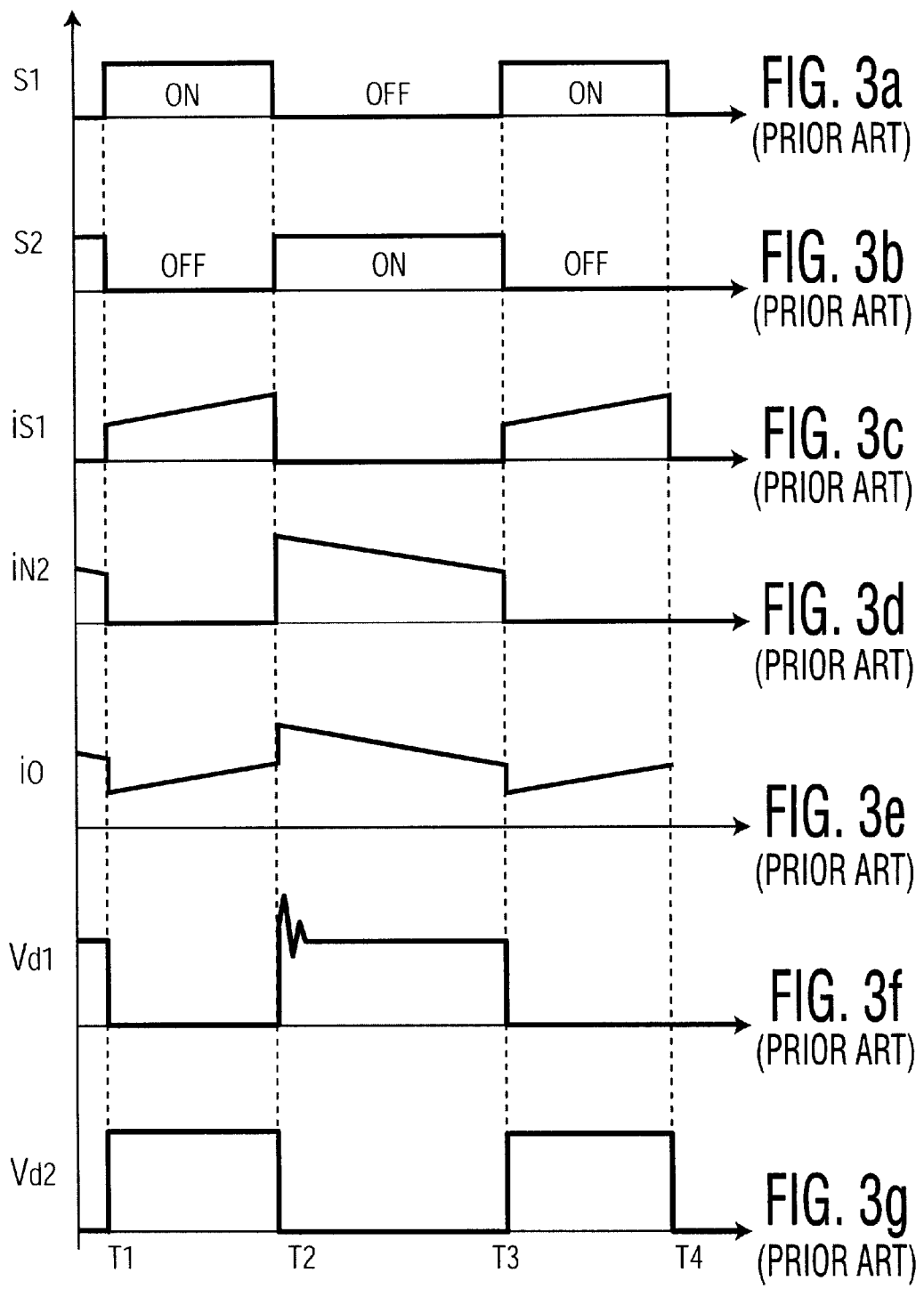
FIGS. 3a–3g illustrate representative waveforms of the circuit of FIG. 2.
Figure 4:
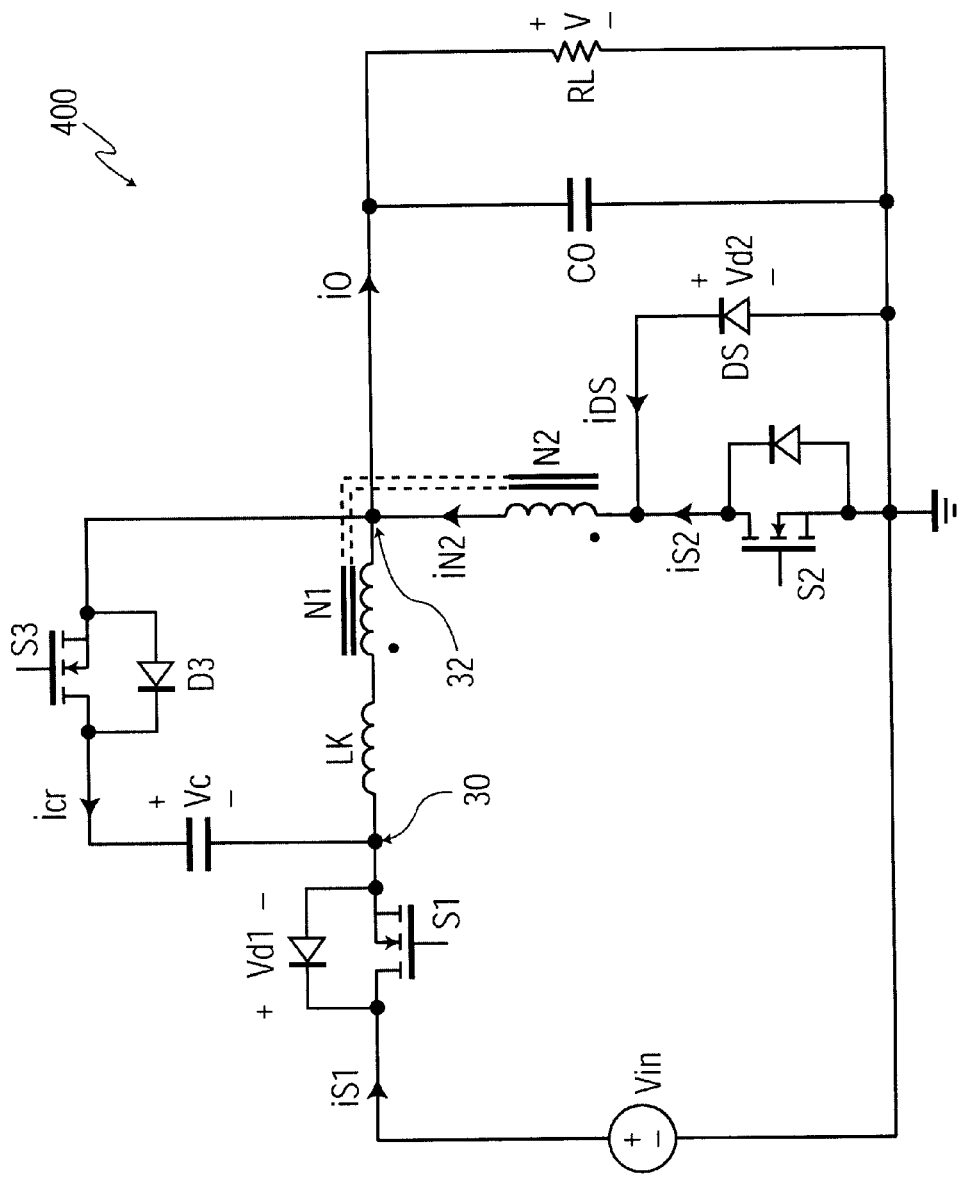
FIG. 4 is a circuit diagram illustrating an active clamp step-down converter circuit with a power switch voltage clamping function in accordance with an embodiment of the present invention.

FIG. 4 is a circuit diagram of a first embodiment for overcoming the afore-stated disadvantage of circuit 200. The converter circuit 400 of the present embodiment will be described with reference to FIGS. 5a–5j which illustrate the corresponding switching waveforms associated with the converter circuit 400.

The converter circuit 400 includes a first power switch S1 connected across an unregulated DC input source, $V_{in}$. One side of power switch S1 is connected to a leakage inductor $L_k$ associated with winding N1. Leakage inductor $L_k$ is connected at junction 30 to clamping capacitor $C_r$.

The circuit branch which includes clamping capacitor Cr in series with switch S3 is referred to as an active clamp circuit for clamping the voltage across switch S1 during transitions of the switch S1 from the ON to the OFF state. One terminal of switch S3, a common terminal of magnetically coupled windings N1 and N2 and one terminal of filter capacitor $C_O$ are connected at a common junction 32.

As described with reference to power switches S1, S2 above, power switch S3 may be a power MOSFET or other well-known semiconductor switch as would be appreciated by those skilled in the art. Switch S3 includes internal body diode D3. The converter circuit 400 further includes filter capacitor CO connected in parallel with a load $R_L$.

Figure 5:
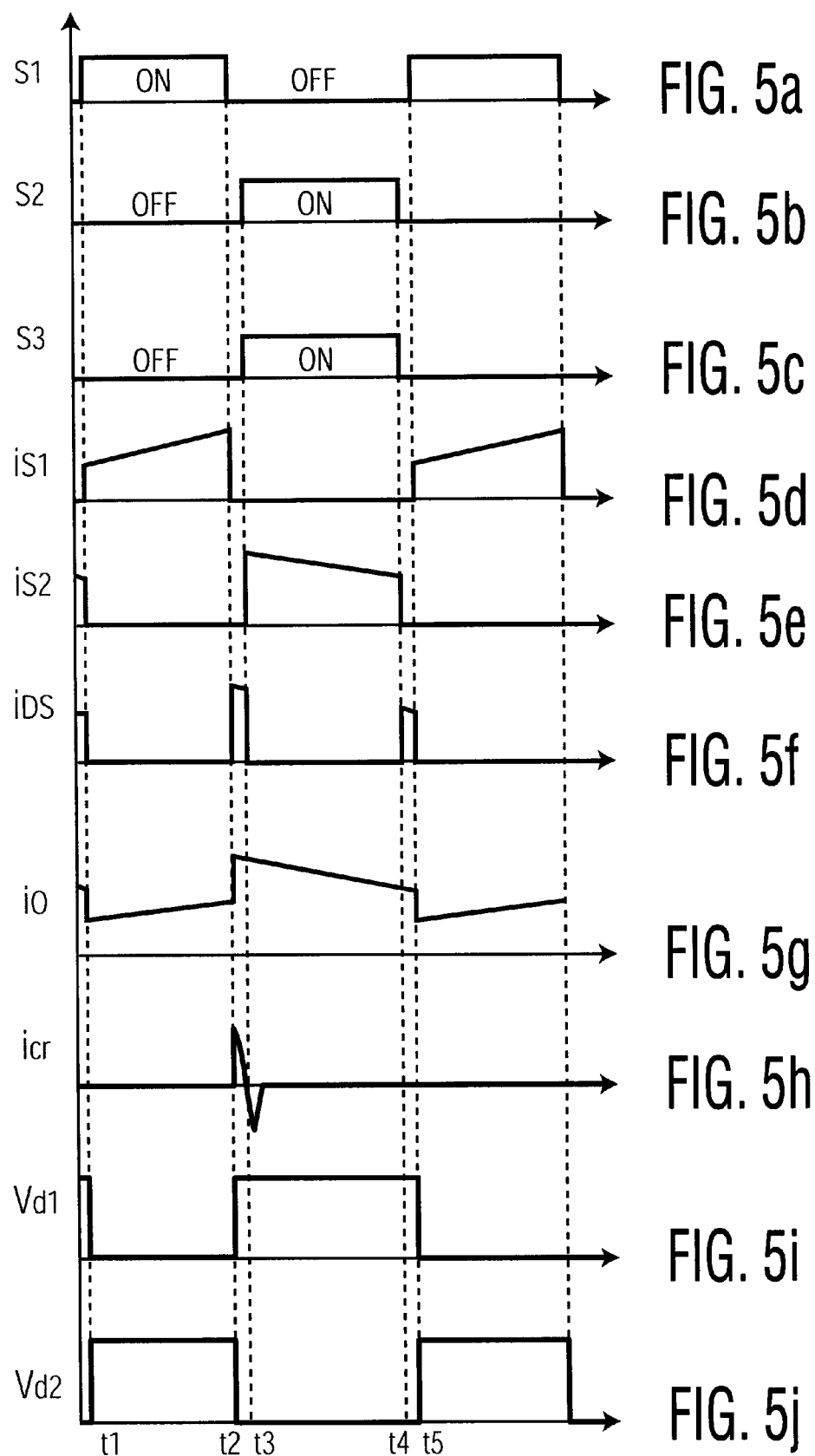
FIGS. 5a–5j illustrate representative waveforms of the circuit of FIG. 4.

With reference to FIGS. 5a–5j, at a time prior to time t1, switch S1 is OFF. From a time t1 to a time t2, switch S1 is turned ON (see FIG. 5a) and switches S2 and S3 are turned off (see FIGS. 5b and 5c). The voltage difference between the input voltage $V_{in}$, and the output voltage $V_o$ is applied to winding N1 of the coupled inductor winding pair (N1,N2). The switching current $i_{s1}$, and output current $i_o$ increase linearly as shown in FIGS. 5d and 5g, respectively. The voltage across switch S2 can be written as:

$$V_{d2}=V_o+(V_{in}-V_o)(N2/N1) \quad (3)$$

As shown in FIG. 5j, the input voltage delivers power to the output until switch S1 turns off at time t2.

After a time t2, switch S1 is turned OFF. The energy stored in winding N1 from time t1 to t2 is transferred to winding N2. The winding current N2 flows through schottky diode DS (see FIG. 5f) until switch S2 turns on at a time equal to t3. The leakage energy stored in leakage inductor $L_k$ charges the clamping capacitor $C_r$ through the body diode of switch S3.

At a time equal to t3, switches S2 and S3 turn on at zero voltage switching because the anti-parallel diodes of both switches are conducting before t3. As such, there is no turn-on switching loss for switches S2 and S3. The charged energy in clamping capacitor $C_r$ is delivered to the output through coupling inductor windings N1 and N2 after a time t3. The clamping voltage $V_c$ across clamping capacitor $C_r$ may be written as:

$$V_c=(N1/N2)*V_o \quad (4)$$

It is therefore shown that the maximum voltage stress across switch S1 is the sum of the input voltage $V_{in}$, and clamping capacitor voltage $V_c$. Voltage $V_{d1}$ may be written as:

$$V_{d1}=(N1/N2)*V_o+V_{in} \quad (5)$$

Equation (5) illustrates that the voltage stress across switch S1 is fully clamped. The winding current $i_{N2}$ continues to flow through switch S2 until at time equal to t4, at which point switch S2 is turned off. The stored energy in winding N2 continues to deliver to the output until a time equal to t5 when switch S1 is turned on.

Figure 6:
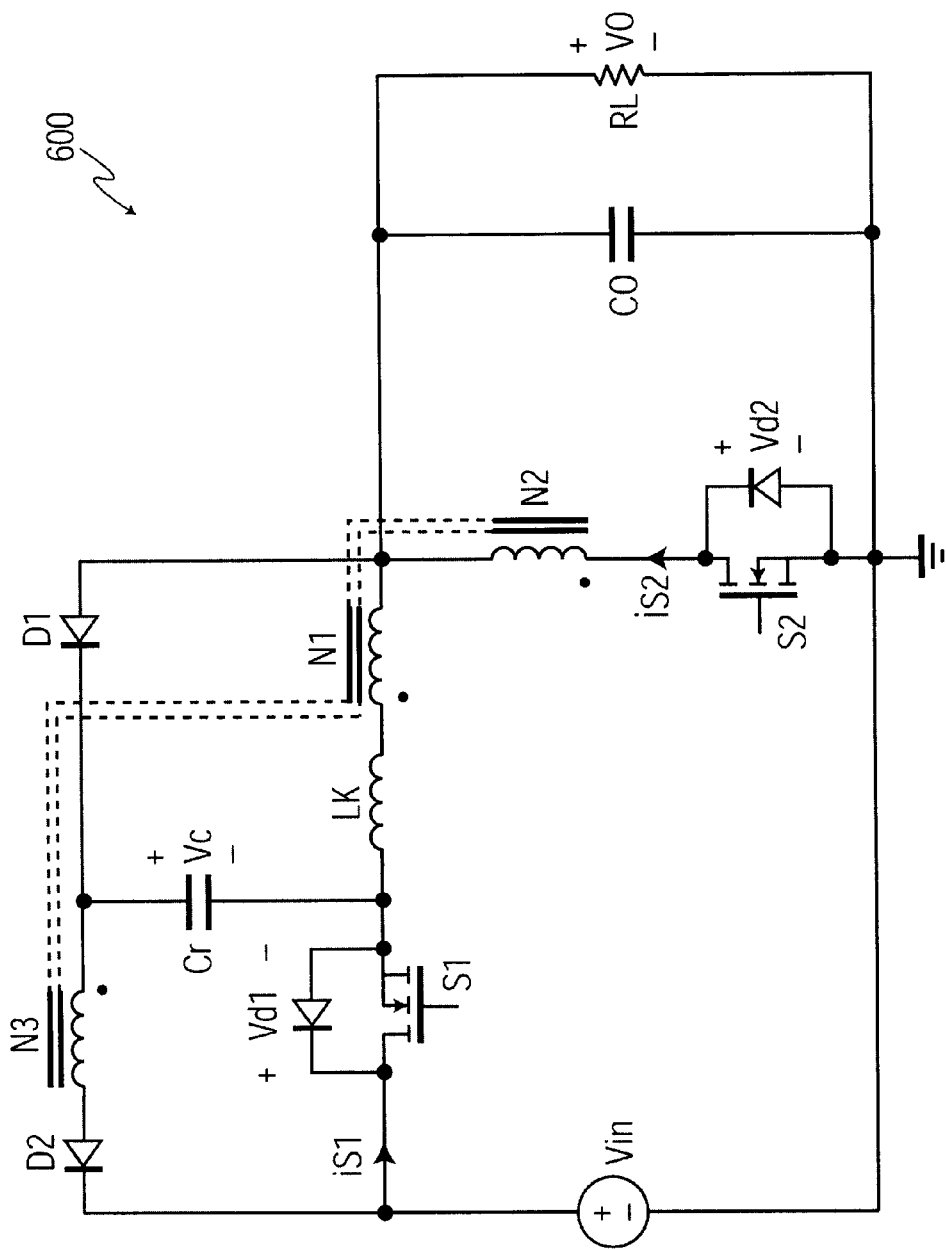
FIG. 6 is a circuit diagram illustrating a clamped step-down converter circuit with a power switch voltage clamping function in accordance with another embodiment of the present invention.

FIG. 6 is a circuit diagram of a second embodiment of the clamped step-down converter circuit. Identical reference signs as in FIG. 4, indicate identical elements, currents, and voltages. The operation of the converter circuit 600 will be described with reference to FIGS. 7a–7f which illustrate corresponding switching waveforms associated with the converter circuit 600. At a time prior to time t1, switch S1 is OFF.

From a time t1 to a time t2, switch S1 is turned ON (see FIG. 7a) and switch S2 is turned off (see FIG. 7b). The voltage difference between the input voltage $V_{in}$ and the output voltage $V_o$ is applied to winding N1 of the coupled inductor winding (N1,N2,N3). The switching current $i_{s1}$ increases linearly as shown in FIG. 7d. The clamping capacitor voltage $V_c$ is applied to the winding N3 at time t1 thereby transferring energy to winding N3 during the time t1 to t2. As a consequence of winding N3 being magnetically coupled to N1, the energy in N3 from capacitor $C_r$ is transferred from winding N3 to N1. The transferred energy in N1 is in turn transferred to load $R_L$. During this time, diode D2 blocks the resonance between the clamping capacitor $C_r$ and the inductance of winding N3 to allow the energy transfer from capacitor $C_r$ to winding N3 and subsequently to the load via the winding N1. The energy transfer process described, namely the transfer of energy stored in capacitor $C_r$ to the output through winding N1 continues until the capacitor voltage $V_c$ is clamped to the reflected voltage from coupled windings N1 and N2.

At a time equal to t2, switch S1 turns OFF and switch S2 turns ON (See FIGS. 7a and 7b). Energy previously stored in winding N1 is transferred to winding N2 and the current in winding N2 flows through switch S2. The leakage energy previously stored in leakage inductor $L_k$ during the time t1 to t2 is not transferrable to winding N2. As such, at time t2 this leakage energy charges clamping capacitor $C_r$ through diode D1. The capacitor voltage can be written as:

$$V_c=(N1/N2)*V_o \quad (6)$$

The maximum voltage stress $V_{d1}$, across switch S1 is the sum of the input voltage $V_{in}$ and clamping capacitor voltage $V_c$. Voltage $V_{d1}$ in may be written as:

$$V_{d1}=V_{in}+(N1/N2)*V_o \quad (7)$$

Equation (7) illustrates that the voltage across switch S1 has been clamped and the leakage energy in winding N1 is recovered and delivered to the output.

While the invention has been described with respect to specific embodiments by way of illustration, many modifications and changes will be apparent to those skilled in the art. It is therefore, to be understood that the appended claims are intended to cover all such modifications and changes as fall within the true spirit and scope of the invention.

I claim:

1. A converter circuit, comprising:
    a base circuit including
        a first switching element connected to a first junction,
        a first winding coupled to the first junction and connected to a second junction,
        a second winding magnetically coupled to said first winding and connected to the second junction, and
        a switch-diode circuit connected to said second winding; and
    a clamp circuit for clamping voltage across said first switching element at a predetermined level, said clamp circuit including
        a second switching element connected to the second junction, and
        a clamping capacitor connected to said second switching element and the first junction, wherein said clamping capacitor is adapted to recover leakage energy from said first winding.

2. The converter circuit of claim 1, wherein the switch-diode circuit includes a third switching element connected to said second winding.

3. The converter circuit of claim 2, wherein the switch-diode circuit includes a diode connected in parallel with said third switching element.

4. The converter circuit of claim 1, wherein said bas e circuit further includes a filter capacitor coupled in parallel to a load.

5. The converter circuit of claim 1, wherein said converter circuit is a DC-DC converter circuit.

6. A method for clamping a voltage across a switching element in a converter circuit, said method comprising:
   providing a base circuit including
      a first switching element connected to a first junction,
      a first winding coupled to the first junction and connected to a second junction,
      a second winding magnetically coupled to said first winding and connected to the second junction, and
      a switch-diode circuit connected to said second winding; and
   providing a clamp circuit for clamping a voltage across said first switching element at a predetermined level, said clamp circuit including
      a second switching element connected to the second junction, and
      a clamping capacitor connected to said second switching element and the first junction, wherein said clamping capacitor is adapted to recover leakage energy from said first winding.

7. The method of claim 6, wherein said clamping step is performed at a time when said first switching element transitions from an ON state to an OFF state.

8. The method of claim 6, wherein said clamping capacitor recovers energy during an OFF state of said first switching element.

9. The method of claim 6, further comprising the step of recovering leakage from a leakage inductor associated with said first winding in each switching cycle.

10. The method of claim 6, wherein the leakage energy in said inductor is recovered by charging the clamping capacitor through said second diode and said third switching element.

11. A converter circuit, comprising:
   a base circuit including
      a first switching element connected to a first junction,
      a first winding coupled to the first junction and connected to a second junction,
      a second winding magnetically coupled to said first winding and connected to the second junction; and
   a clamp circuit for clamping a voltage across said first switching element at a predetermined level, said clamp circuit including
      a clamping capacitor connected to the first junction and a third junction, wherein said clamping capacitor is adapted to recover leakage energy from said first winding,
      a first diode connected to the second junction and the third junction,
      a third winding magnetically coupled to said first winding and said second winding, and connected to the third junction, and
      a second diode connected to said third winding.

12. The converter circuit of claim 11, wherein said converter circuit further includes a filter capacitor coupled in parallel to a load.

13. The converter circuit of claim 11, wherein said converter circuit is a DC-DC converter circuit.

14. A method for clamping a voltage across a switching element in a converter circuit, said method comprising:
   providing a base circuit including
      a first switching element connected to a first junction,
      a first winding coupled to the first junction and connected to a second junction,
      a second winding magnetically coupled to said first winding and connected to the second junction; and
   a clamp circuit for clamping a voltage across said first switching element at a predetermined level, said clamp circuit including
      a clamping capacitor connected to the first junction and a third junction, wherein said clamping capacitor is adapted to recover leakage energy from said first winding,
      a first diode connected to the second junction and the third junction,
      a third winding magnetically coupled to said first winding and said second winding, and connected to the third junction, and
      a second diode connected to said third winding.

15. The method of claim 14, wherein the clamping is performed at a time when said switching element transitions from an ON state to an OFF state.

16. The method of claim 14, wherein said clamping capacitor recovers energy during an OFF state of said first switching element.

17. The method of claimi 14, further comprising the step of recovering leakage from an inductor associated with said first winding in each switching cycle.

18. The method of claim 17, where in the leakage energy in said inductor is recovered by charging the clamping capacitor through said first diode and said third winding.

* * * * *